Dec. 24, 1935.  D. VON MIHÁLY  2,025,366
PORTABLE SOUND FILM REPRODUCING APPARATUS
Filed Nov. 23, 1933
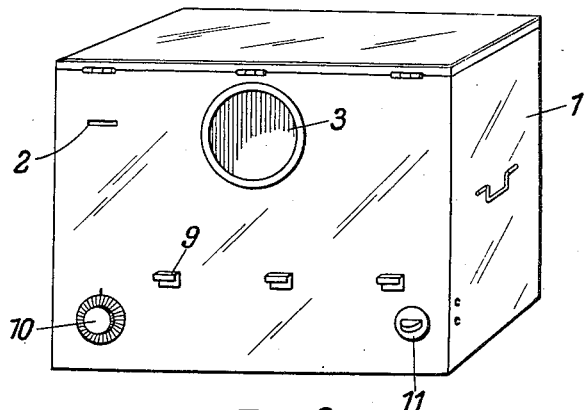
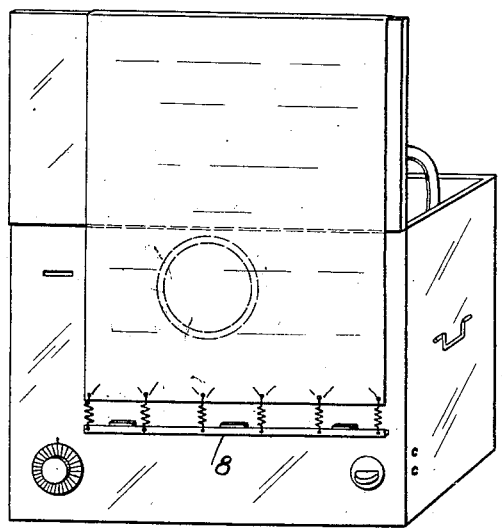
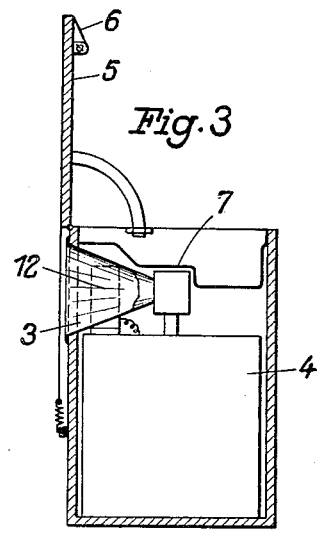
Inventor:
Dénes von Mihály
Attorneys
Bailey & Larson Patented Dec. 24, 1935

2,025,366

UNITED STATES PATENT OFFICE 2,025,366

PORTABLE SOUND FILM REPRODUCING APPARATUS

Dénes von Mihály, Berlin, Germany

Application November 23, 1933, Serial No. 699,469
In Germany March 6, 1931

6 Claims. (Cl. 88—16.2)

My invention relates to portable sound film reproducing apparatus, and more particularly to apparatus of this type wherein an image of the sound record is projected from the film on to a light sensitive cell located behind a gap in a screen, the screen, the cell, and the circuits associated therewith are constructively and electrically entirely separate from the appliance for projecting the sound record.

According to my invention such apparatus is made suitable for being used as home sound film projector by arranging the screen for projecting the image of the sound record, the light sensitive cell, the amplifier, the loud-speaker, and the screen for projecting the pictures within a portable box. A part of the front wall of this box forms the screen for projecting the image of the sound record and is provided with a gap behind which the light sensitive cell is located within the box. The screen for projecting the pictures is fastened with its upper edge to the cover of the box so that after opening the box and fixing its cover in vertical position this screen can be spanned before the cover and the front wall of the same. This procedure can be effected within a few seconds, and, this being the only action which is necessary for mounting all above mentioned parts ready for work, it is obvious that the invention enables to reduce the time for making the apparatus ready for use to a little fraction of the time which has been necessary for the same purpose with any known apparatus. Moreover, the box can comfortably be transported by a single person, and it affords safe protection to the sensible parts of the apparatus, like the light-sensitive cell, the amplifier and the loud-speaker.

The drawing shows one embodiment of my invention by way of example.

Fig. 1 shows the closed box.

Fig. 2 shows the box ready for use in front view.

Fig. 3 shows the box ready for use in side view.

The front wall of the box 1 is provided with a gap 2 and with an opening for the loud-speaker 3. Within the box there are the amplifier 4 and the light-sensitive cell 12, the latter being arranged behind the gap 2. The screen 6 for projecting the pictures is fastened with its upper edge to the inside of the cover 5 of the box and rests folded in the tray 7. 10 is a regulator and 11 is a switch.

In order to make the apparatus ready for use the cover 5 of the box 1 will be opened and fixed in its vertical position. Then the screen 6 will be taken out of the tray 7, unfolded, and brought into the position shown in Fig. 2 whereupon it will be spanned by screwing its lower edge by means of the rail 8 to the hooks 9 on the front-wall of the box. For securing the smooth position of the screen there are provided springs 13 between the lower edge of the screen and the rail 8 by which a certain tension is applied to the screen.

What I claim is:

1. A portable unit for reproducing projected sound records and projected picture images, comprising a container having an aperture in its front wall, a photoelectric cell in said container aligned with said aperture, an amplifier in said container connected to said photo-electric cell to amplify the currents, a loud speaker in said container connected to said amplifier, a cover hinged to the front wall of said container, means to hold said cover in alignment with said front wall, a screen having one edge secured to the free edge of said cover, and means on the front wall of the container to hold the other edge of the screen.

2. A portable unit for reproducing projected sound records and projected picture images, comprising a container having an aperture in its front wall, a photo-electric cell in said container aligned with said aperture, an amplifier in said container connected to said photo-electric cell to amplify the currents, a loud speaker in said container connected to said amplifier, a cover hinged to the front wall of said container, means to hold said cover in alignment with said front wall, and a flexible screen having one edge secured to the free edge of said cover, said screen being longer than the width of said cover, whereby the screen may cover at least a portion of the front wall of the container.

3. A portable unit for reproducing projected sound records and projected picture images, comprising a container having an aperture in its front wall, a photo-electric cell in said container aligned with said aperture, an amplifier in said container connected to said photo-electric cell to amplify the currents, a loud speaker in said container connected to said amplifier, a cover hinged to the front wall of said container, means to hold said cover in alignment with said front wall, said loud speaker being arranged in the front wall of said container, and a flexible screen having one edge secured to the free edge of the cover, said screen being longer than the width of the cover whereby the screen may cover at least a portion of the front wall of the container and the loud speaker.

4. A portable unit for reproducing projected sound records and projected picture images, comprising a container having an aperture in its front wall, a photo-electric cell in said container aligned with said aperture, an amplifier in said container connected to said photo-electric cell to amplify the currents, a loud speaker in said container connected to said amplifier, a cover hinged to the front wall of said container, means to hold said cover in alignment with said front wall, said loud speaker being arranged in the front wall of said container, a flexible screen having one edge secured to the free edge of the cover, said screen being longer than the width of the cover whereby the screen may cover at least a portion of the front wall of the container and the loud speaker, and cooperating means on the front wall and on the screen including means on the front wall below the loud speaker to hold the lower edge of said screen.

5. A portable unit for reproducing projected sound records and projected picture images, comprising a container having an aperture in its front wall, a photo-electric cell in said container aligned with said aperture, an amplifier in said container connected to said photo-electric cell to amplify the currents, a loud speaker in said container connected to said amplifier, a cover hinged to the front wall of said container, means to hold said cover in alignment with said front wall, said loud speaker being arranged in the front wall of said container, a flexible screen having one edge secured to the free edge of the cover, said screen being longer than the width of the cover whereby the screen may cover at least a portion of the front wall of the container and the loud speaker, and cooperating means on the front wall and on the screen including means on the front wall below the loud speaker to hold the lower edge of said screen, said last means including resilient members connected to said screen.

6. A portable unit for reproducing projected sound records and projected picture images, comprising a container having an aperture in its front wall, a photo-electric cell in said container aligned with said aperture, an amplifier in said container connected to said photo-electric cell to amplify the currents, a loud speaker in said container connected to said amplifier, a cover hinged to the front wall of said container, means to hold said cover in alignment with said front wall, a screen fastened to said cover, hooks on the front wall of said container, means on said screen for fastening the screen to said hooks, and elastic members connecting said fastening means and said screen.

DÉNES VON MIHÁLY.